(12) United States Patent
Ellwood, III et al.

(10) Patent No.: US 11,326,473 B2
(45) Date of Patent: May 10, 2022

(54) BEARING ASSEMBLY AND TURBOCHARGER INCLUDING THE BEARING ASSEMBLY

(71) Applicant: BorgWarner Inc., Auburn Hills, MI (US)

(72) Inventors: Erwin Perry Ellwood, III, Candler, NC (US); Samuel Whitney Weldon, Asheville, NC (US); Donald Michael Kennedy, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 89 days.

(21) Appl. No.: 16/719,236

(22) Filed: Dec. 18, 2019

(65) Prior Publication Data
US 2021/0189907 A1    Jun. 24, 2021

(51) Int. Cl.
*F01D 25/16* (2006.01)
*F01D 25/04* (2006.01)
*F16C 19/18* (2006.01)

(52) U.S. Cl.
CPC ........... *F01D 25/164* (2013.01); *F01D 25/04* (2013.01); *F16C 19/18* (2013.01);
(Continued)

(58) Field of Classification Search
None
See application file for complete search history.

(56) References Cited

U.S. PATENT DOCUMENTS 3,801,215 A    4/1974 Osborne
4,329,000 A *  5/1982 Keske ............... F01D 25/16
                                              384/464
(Continued)

FOREIGN PATENT DOCUMENTS

CN    1890475      1/2007
CN    1890475 A    1/2007
(Continued)

OTHER PUBLICATIONS

English language abstract for CN 1890475 extracted from espacenet.com database on Jan. 16, 2020, 1 page.
(Continued)

*Primary Examiner* — Juan G Flores
(74) *Attorney, Agent, or Firm* — Howard & Howard Attorneys PLLC

(57) ABSTRACT

A turbocharger includes a shaft, a compressor wheel, a turbine wheel, and a bearing assembly. The bearing assembly includes an inner race coupled to the shaft, and first and second outer races spaced radially from the inner race. The bearing assembly also includes a first rolling element disposed between the first outer race and the inner race, and a second rolling element disposed between the second outer race and the inner race. The bearing assembly further includes a first biasing member coupled to the first outer race and configured to bias the first outer race toward the second outer race and against the first rolling element to preload the first rolling element, and a second biasing member coupled to the second outer race and configured to bias the second outer race toward the first outer race and against the second rolling element to preload the second rolling element.

19 Claims, 6 Drawing Sheets

(52) U.S. Cl.
CPC ...... *F05D 2220/40* (2013.01); *F05D 2240/50* (2013.01); *F05D 2260/30* (2013.01); *F16C 2360/24* (2013.01)

(56) References Cited

U.S. PATENT DOCUMENTS

| | | | |
|---|---|---|---|
| 7,371,011 B2* | 5/2008 | McKeirnan, Jr. | F01D 25/16 |
| | | | 384/504 |
| 7,517,154 B2 | 4/2009 | McKeirnan, Jr. | |
| 8,186,886 B2 | 5/2012 | McKeirnan, Jr. | |
| 9,816,551 B2 | 11/2017 | Regnier et al. | |
| 2007/0183704 A1 | 8/2007 | Umekawa | |
| 2012/0282078 A1 | 11/2012 | Marsal et al. | |
| 2014/0234071 A1 | 8/2014 | Berhan | |
| 2016/0341252 A1 | 11/2016 | Penn | |
| 2018/0180094 A1 | 6/2018 | Ehrhard | |
| 2019/0360524 A1 | 11/2019 | Ellwood, III et al. | |

FOREIGN PATENT DOCUMENTS

| | | |
|---|---|---|
| CN | 104632691 | 5/2015 |
| CN | 104632691 A | 5/2015 |
| EP | 1895164 B1 | 3/2017 |
| FR | 3 057 311 | 4/2018 |
| FR | 3057311 A1 | 4/2018 |
| GB | 2183736 B | 11/1989 |
| JP | 2005-240978 | 9/2005 |
| JP | 2005240978 A | 9/2005 |
| JP | 2010-242822 | 10/2010 |
| JP | 2010242822 A | 10/2010 |
| JP | 2014-126083 | 7/2014 |
| JP | 2014126083 A | 7/2014 |
| JP | 2016-056828 | 4/2016 |
| JP | 2016056828 A | 4/2016 |
| JP | 2016-537564 | 12/2016 |
| JP | 2016537564 A | 12/2016 |
| WO | 2006046891 A1 | 5/2006 |
| WO | 2015120129 A1 | 8/2015 |
| WO | 2016128659 A1 | 8/2016 |
| WO | WO 2016/128659 | 8/2016 |

OTHER PUBLICATIONS

English language abstract and machine-assisted English language translation for CN 104632691 extracted from espacenet.com database on Jan. 16, 2020, 5 pages.

English language abstract and machine-assisted English language translation for FR 3 057 311 extracted from espacenet.com database on Jan. 16, 2020, 10 pages.

English language abstract and machine-assisted English language translation for JP 2005-240978 extracted from espacenet.com database on Jan. 16, 2020, 11 pages.

English language abstract for JP 2010-242822 extracted from espacenet.com database on Feb. 5, 2020 and machine-assisted English language translation for JP 2010-242822 extracted from the Japanese Patent Office database on Feb. 5, 2020, 18 pages.

English language abstract and machine-assisted English language translation for JP 2014-126083 extracted from espacenet.com database on Jan. 16, 2020, 5 pages.

English language abstract and machine-assisted English language translation for JP 2016-056828 extracted from espacenet.com database on Jan. 16, 2020, 7 pages.

English language abstract for JP 2016-537564 extracted from espacenet.com database on Jan. 16, 2020, 2 pages.

English language abstract and machine-assisted English language translation for WO 2016/128659 extracted from espacenet.com database on Jan. 16, 2020, 6 pages.

* cited by examiner

BEARING ASSEMBLY AND TURBOCHARGER INCLUDING THE BEARING ASSEMBLY

BACKGROUND OF THE INVENTION

1. Field of the Invention

The present invention generally relates to a turbocharger for delivering compressed air to the internal combustion engine.

2. Description of the Related Art

Turbochargers receive exhaust gas from an internal combustion engine and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine in the vehicle reduces the mass and aerodynamic frontal area of the vehicle, which helps reduce fuel consumption of the internal combustion engine and improve fuel economy of the vehicle.

Typical turbochargers include a shaft extending along an axis between a first shaft portion and a second shaft portion spaced from the first shaft portion along the axis, a compressor wheel coupled to the first shaft portion of the shaft, and a turbine wheel coupled to the second shaft portion of the shaft. Typical turbochargers also include a bearing assembly disposed between the first and second shaft portions of the shaft. The bearing assembly is coupled to the shaft for supporting rotation of the shaft.

Typical bearing assemblies include a first inner race, a second inner race, and an outer race. The first and second inner races have an interference fit with the shaft. These bearing assemblies also include a first rolling element disposed between the outer race and the first inner race for supporting rotation of the shaft, and a second rolling element disposed between the outer race and the second inner race for supporting rotation of the shaft.

Components in typical bearing assemblies are arranged in a configuration where the preloading of the first and second rolling elements is negatively affected by tolerances of the components, particularly by tolerances between the first and second inner races and the shaft because of the interference fit required between the first and second inner races and the shaft. The preloading of the first and second rolling elements is also affected by thermal deformation of the components of the typical bearing assemblies because thermal deformation of the components worsens the impact the tolerances of the components have on the bearing assembly. Therefore, the components of typical bearing assemblies fail to maintain sufficient forces on the first and second rolling elements to preload the first and second rolling elements, thus resulting in skidding of the first and second rolling elements. Alternatively, when preloading the first and second rolling elements, the components of typical bearing assemblies exert excessive forces on the first and second rolling elements, thus resulting in premature failure of the bearing assembly.

As such, there remains a need to provide an improved bearing assembly for a turbocharger.

SUMMARY OF THE INVENTION AND ADVANTAGES

A turbocharger is disclosed. The turbocharger delivers compressed air to an internal combustion engine. The turbocharger includes a shaft extending along an axis A between a first shaft portion and a second shaft portion spaced from the first shaft portion along the axis A, a compressor wheel coupled to the first shaft portion of the shaft, and a turbine wheel coupled to the second shaft portion of the shaft. The turbocharger also includes a bearing assembly disposed between the first and second shaft portions of the shaft, and the bearing assembly is coupled to the shaft for supporting rotation of the shaft.

The bearing assembly includes an inner race, a first outer race, and a second outer race. The first inner race is coupled to the shaft between the first and second shaft portions of the shaft. The first outer race is proximate to the first shaft portion of the shaft, and is spaced radially from the inner race. The second outer race is proximate to the second shaft portion of the shaft, and is both spaced from the first outer race along the axis and spaced radially from the inner race. The bearing assembly also includes a first rolling element disposed between the first outer race and the inner race for supporting rotation of the shaft, and a second rolling element disposed between the second outer race and the inner race for supporting rotation of the shaft.

The bearing assembly further includes a first biasing member coupled to the first outer race. The first biasing member is configured to bias the first outer race toward the second outer race and against the first rolling element to preload the first rolling element. The bearing assembly also includes a second biasing member coupled to the second outer race. The second biasing member is configured to bias the second outer race toward the first outer race and against the second rolling element to preload the second rolling element.

The arrangement of the components in the bearing assembly allows for a more consistent preloading of the first and second rolling elements as compared to typical bearing assemblies. More specifically, the arrangement of components in the bearing assembly minimizes the impact that tolerances of the components in the bearing assembly have on the preloading of the first and second rolling elements. In particular, the combination of the inner race and the first and second outer races being biased toward one another by the first and second biasing members limits the impact that tolerances have between the inner race and the shaft.

Additionally, the arrangement of components limits the impact that thermal deformation has on the preloading of the first and second rolling elements, thus further limiting the impact that tolerances have on the bearing assembly. As such, the arrangement of components in this bearing assembly consistently exerts appropriate forces to preload the first and second rolling elements without skidding of the first and second rolling elements and without risking premature failure of the bearing assembly.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
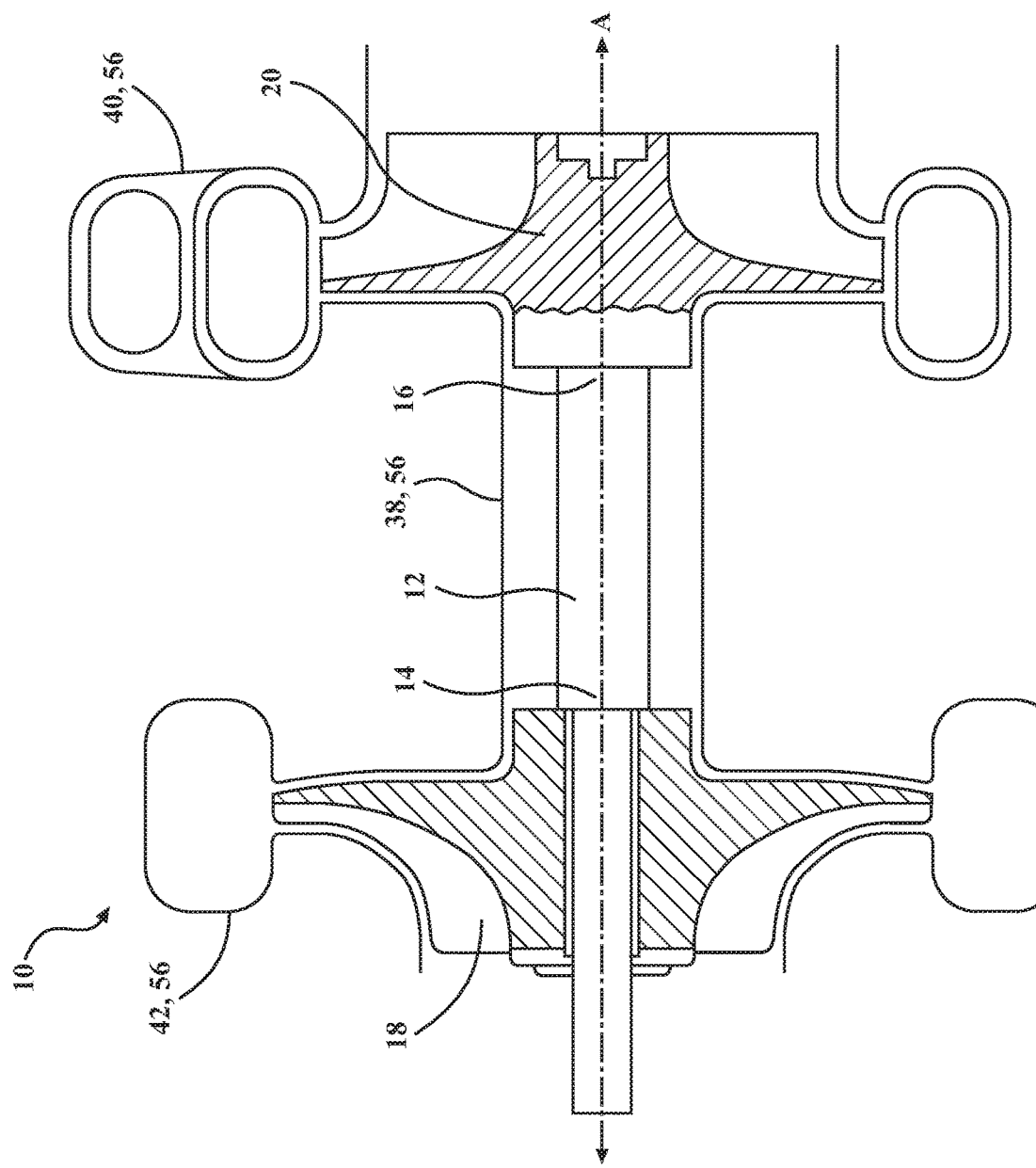
FIG. 1 is a schematic illustration of a turbocharger extending along an axis A.

With reference to the Figures, wherein like numerals indicate like parts throughout the several views, a turbocharger 10 is shown schematically in FIG. 1. The turbocharger 10 receives exhaust gas from an internal combustion engine to deliver compressed air to the internal combustion engine. The turbocharger 10 includes a shaft 12 extending along an axis A between a first shaft portion 14 and a second shaft portion 16 spaced from the first shaft portion 14 along the axis A, a compressor wheel 18 coupled to the first shaft portion 14 of the shaft 12, and a turbine wheel 20 coupled to the second shaft portion 16 of the shaft 12. The turbocharger 10 also includes a bearing assembly 22 disposed between the first and second shaft portions 14, 16 of the shaft 12. Although not required, the first shaft portion 14 of the shaft 12 may be near the end of the shaft 12 proximate to the compressor wheel 18, and the second shaft portion 16 of the shaft 12 may be near the end of the shaft 12 proximate to the turbine wheel 20. The bearing assembly 22 is coupled to the shaft 12 for supporting rotation of the shaft 12.

The compressor wheel 18 may be disposed in a compressor housing 42, the turbine wheel 20 may be disposed in a turbine housing 40, and the bearing assembly 22 may be disposed in a bearing housing 38. Additionally, the turbocharger 10 may have a back plate 44 disposed either between the compressor housing 42 and the bearing housing 38, between the turbine housing 40 and the bearing housing 38, or disposed within any one of the compressor housing 42, the turbine housing 40, and the bearing housing 38.

Figure 2A:
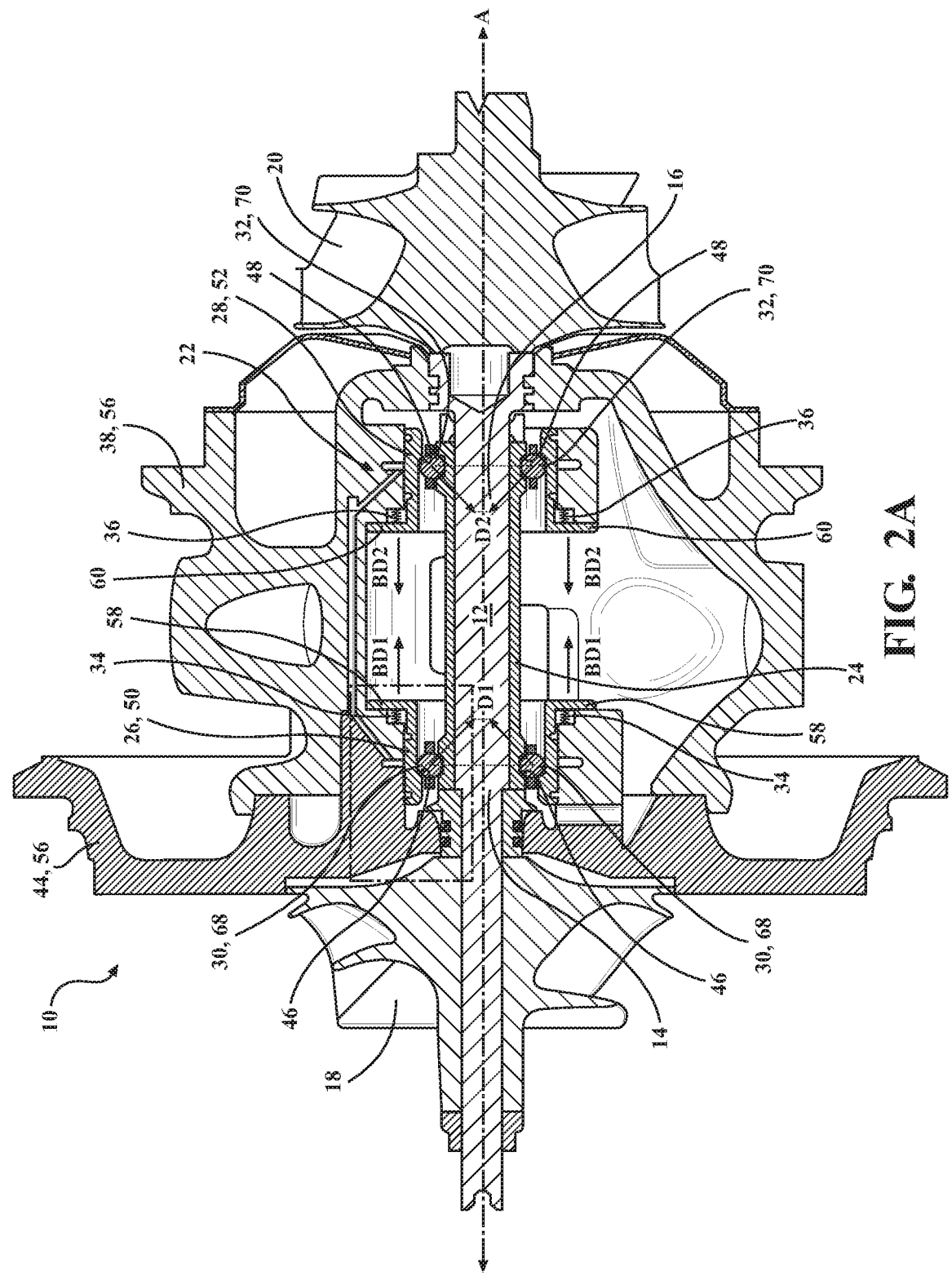
FIG. 2A is a cross-sectional view of the turbocharger, with the inner race being a unitary component.
Figure 2B:
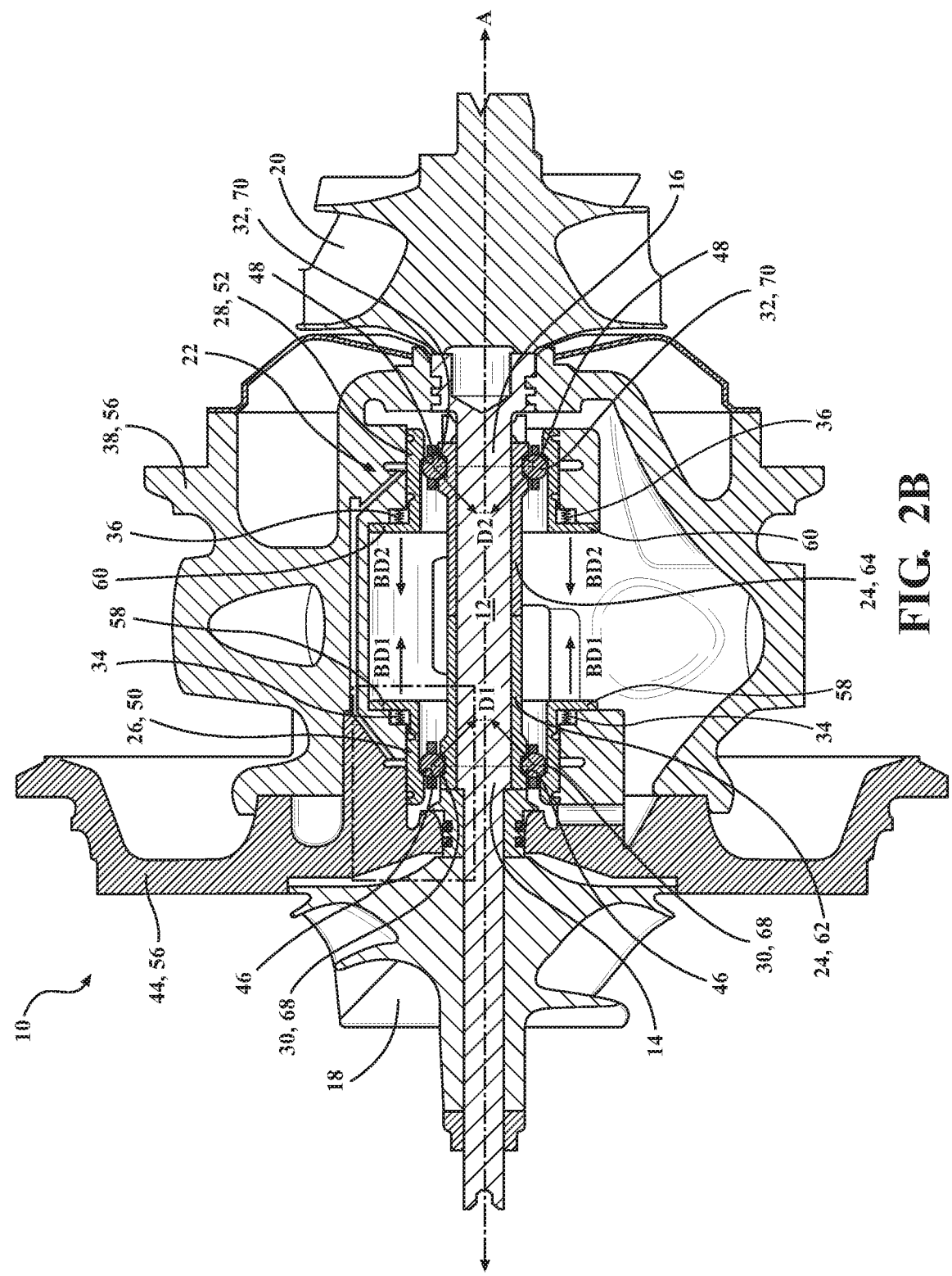
FIG. 2B is a cross-sectional view of the turbocharger, with the inner race including a first inner race and a second inner race.
Figure 2C:
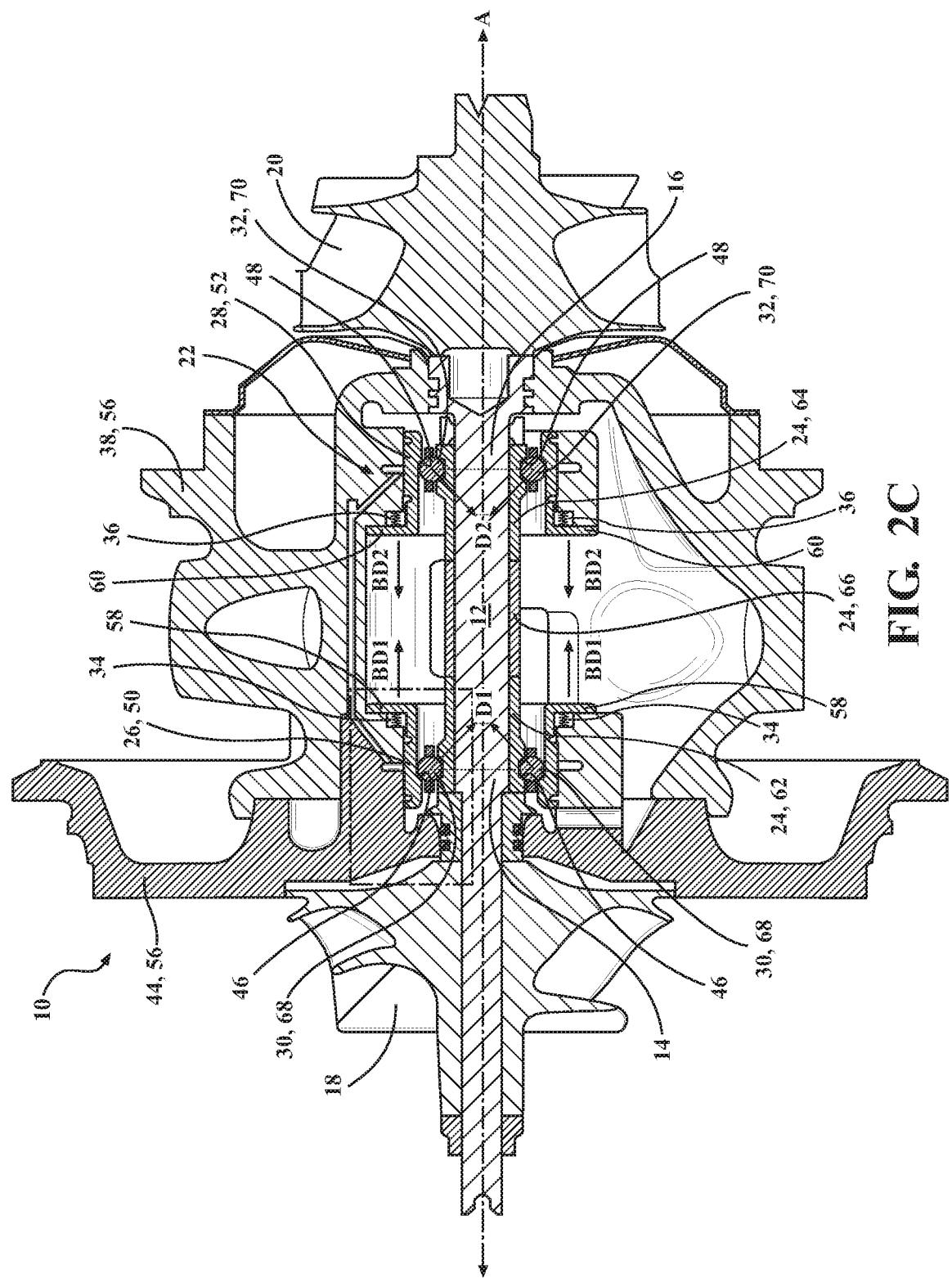
FIG. 2C is a cross-sectional view of the turbocharger, with the inner race including a spacer disposed between the first inner race and the second inner race.

The bearing assembly 22 includes an inner race 24, a first outer race 26, and a second outer race 28, as shown in FIGS. 2A-2C. The inner race 24 extends along the axis A and is coupled to the shaft 12 between the first and second shaft portions 14, 16 of the shaft 12. The first outer race 26 is proximate to the first shaft portion 14 of the shaft 12, and is spaced radially from the inner race 24. The second outer race 28 is proximate to the second shaft portion 16 of the shaft 12, and is both spaced from the first outer race 26 along the axis and spaced radially from the inner race 24. The bearing assembly 22 also includes a first rolling element 30 disposed between the first outer race 26 and the inner race 24 for supporting rotation of the shaft 12, and a second rolling element 32 disposed between the second outer race 28 and the inner race 24 for supporting rotation of the shaft 12.

The first rolling element 30 of the bearing assembly 22 may be a first ball bearing 68. Similarly, the second rolling element 32 of the bearing assembly 22 may be a second ball bearing 70. It is to be appreciated, however, that the first and second rolling elements 30, 32 may be any number of geometric shapes, including cylindrical, and may be bushings or roller bearings.

The bearing assembly 22 further includes a first biasing member 34 coupled to the first outer race 26. The first biasing member 34 is configured to bias the first outer race 26 toward the second outer race 28 and against the first rolling element 30 to preload the first rolling element 30. The bearing assembly 22 also includes a second biasing member 36 coupled to the second outer race 28. The second biasing member 36 is configured to bias the second outer race 28 toward the first outer race 26 and against the second rolling element 32 to preload the second rolling element 32.

The arrangement of the components in the bearing assembly 22, including the inner race 24, the first and second outer races 26, 28, the first and second rolling elements 30, 32, and the first and second biasing members 34, 36, allows for a more consistent preloading of the first and second rolling elements 30, 32 as compared to typical bearing assemblies. More specifically, the arrangement of components in the bearing assembly 22 minimizes the impact that tolerances of the components in the bearing assembly 22 have on the preloading of the first and second rolling elements 30, 32. In particular, the combination of the inner race 24 and the first and second outer races 26, 28 being biased toward one another by the first and second biasing members 34, 36 limits the impact that tolerances have between the inner race 24 and the shaft 12.

Additionally, the arrangement of components limits the impact that thermal expansion has on the preloading of the first and second rolling elements 30, 32, thus further limiting the impact that tolerances have on the bearing assembly 22. As such, the arrangement of components in the bearing assembly 22 consistently exerts appropriate forces to preload the first and second rolling elements 30, 32 without skidding of the first and second rolling elements 30, 32 and without risking premature failure of the bearing assembly 22.

The arrangement of components is configured to exert a first force against the first rolling element 30. The arrangement of components is also configured to exert a second force against the second rolling element 32. The first force is in a direction, for example, the first direction D1 as shown in FIGS. 2A-3B, to preload the first rolling element 30. Similarly, the second force is in another direction, for example, the second direction D2 as shown in FIGS. 2A-3B, to preload the second rolling element 32. The first direction D1 that the first force may be configured to be exerted in may be both radially toward the shaft 12 and axially toward the second outer race 28. In other words, the first direction D1 is essentially conical, as shown in FIGS. 2A-2C. Similarly, the second direction D2 that the second force may be configured to be exerted in may be both radially toward the shaft 12 and axially toward the first outer race 26. In other words, the second direction D2 is essentially conical, as shown in FIGS. 2A-2C. In these embodiments, the first direction D1 and the second direction D2 intersect to define an "X" shape. Additionally, in these embodiments, the first direction D1 and the second direction D2 that the first and second forces are configured to be exerted in, respectively, are both axially and radially inward with respect to the axis A.

The first and second biasing members 34, 36 exert the appropriate forces to preload the first and second rolling elements 30, 32. More specifically, the first biasing member 34 exerts a first biasing force against the first outer race 26 substantially parallel to the axis A and in a first biasing direction BD1. Similarly, the second biasing member 36 exerts a second biasing force against the second outer race 28 substantially parallel to the axis A and in a second biasing direction BD2. The first and second biasing members 34, 36 may be coupled to at least one of the bearing housing 38, the turbine housing 40, the compressor housing 42, and the back plate 44, among other options. The first and second biasing members 34, 36 may be springs, particularly coiled springs or wave springs.

Figure 3A:
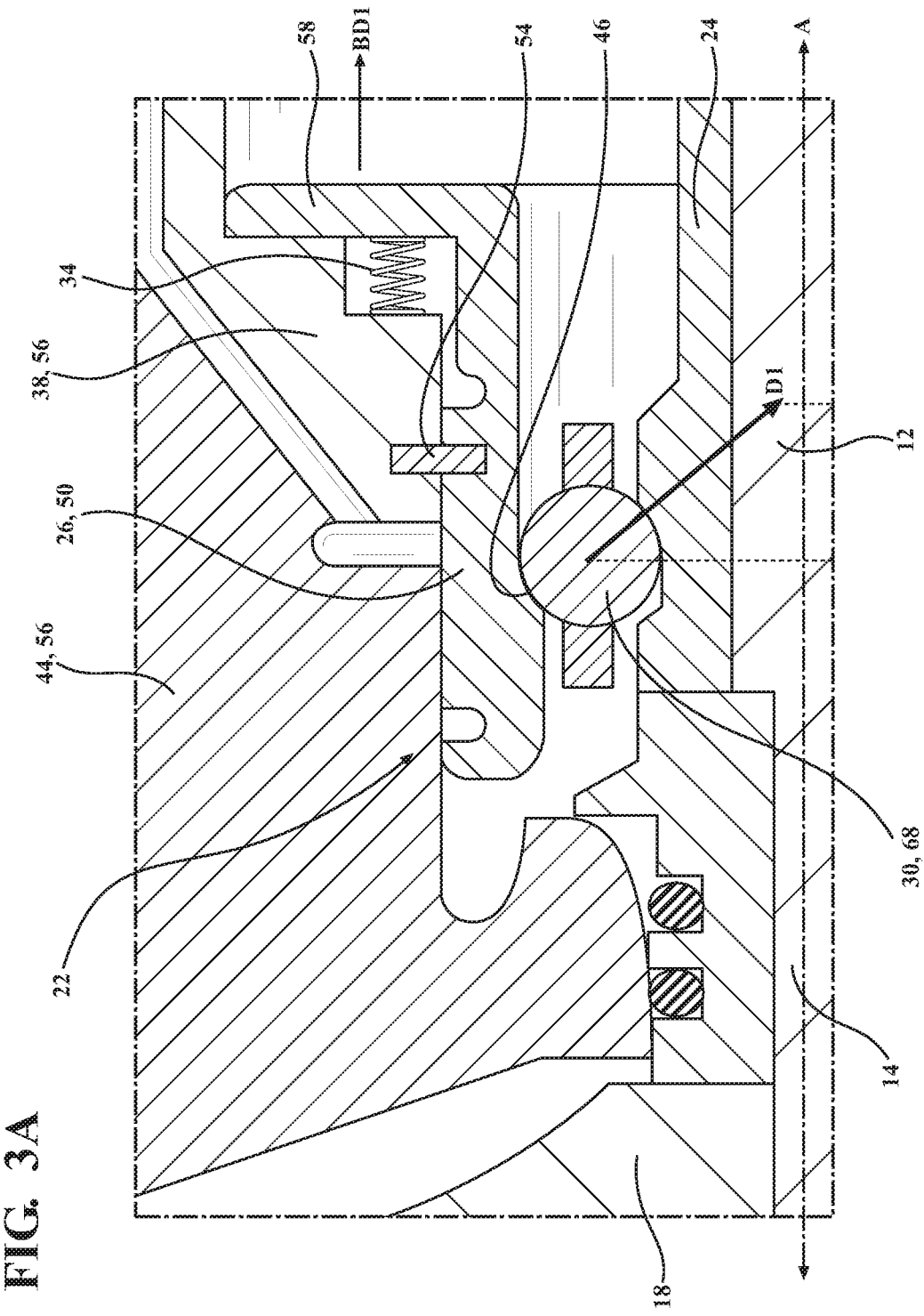
FIG. 3A is a cross-sectional view of the turbocharger illustrated in FIGS. 2A-2C, with the first outer race having a first race surface that is concave.
Figure 3B:
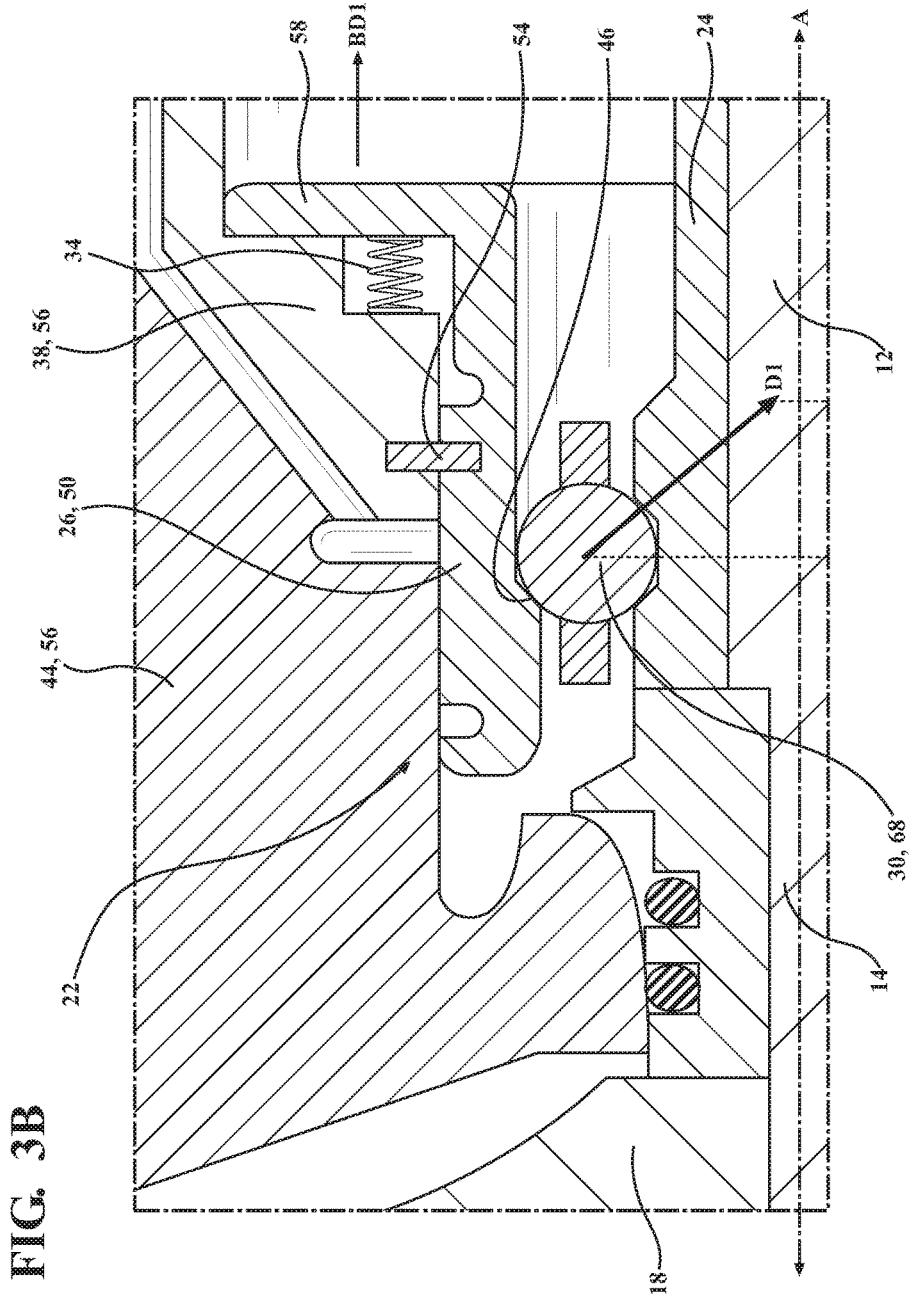
FIG. 3B is a cross-sectional view of the turbocharger illustrated in FIGS. 2A-2C, with the first outer race having the first race surface that is planar.

In some embodiments, as best shown in FIGS. 3A and 3B in combination with FIGS. 2A-2C, the first outer race 26 has a first race surface 46 angularly tilted relative to the axis A that is in contact with the first rolling element 30, and the second outer race 28 has a second race surface 48 angularly tilted relative to the axis A that is in contact with the second rolling element 32. In the embodiments with the first and second race surfaces 46, 48, the first race surface 46 is configured to exert the first force against the first rolling element 30 in the first direction D1 to preload the first rolling element 30, and the second race surface 48 is configured to exert the second force against the second rolling element 32 in the second direction D2 to preload the second rolling element 32. The first force may be exerted either partially or completely circumferentially about the axis A, and the second force may be exerted either partially or completely circumferentially about the axis A.

During operation of the turbocharger 10, the first biasing member 34 exerts the first biasing force in the first biasing direction BD1 against the first outer race 26. The first race surface 46 of the first outer race 26 redirects the first biasing force in the first biasing direction BD1 to the first force in the first direction D1 against the first rolling element 30 to preload the first rolling element 30. Similarly, during operation of the turbocharger 10, the second biasing member 36 exerts the second biasing force in the second biasing direction BD1 against the second outer race 28. The second race surface 48 of the second outer race 28 redirects the second biasing force in the second biasing direction BD1 to the second force in the second direction D1 against the second rolling element 32 to preload the second rolling element 32.

Although not required, in the embodiments with the first and second race surfaces 46, 48, the first direction D1 that the first force is configured to be exerted is both radially toward the shaft 12 and axially toward the second outer race 28, and the second direction D2 that the second force is configured to be exerted is both radially toward the shaft 12 and axially toward the first outer race 26. In these embodiments, the first direction D1 and the second direction D2 may intersect to define the "X" shape. Additionally, in these embodiments, the first direction D1 and the second direction D2 that the first and second forces are configured to be exerted in, respectively, are both axially and radially inward with respect to the axis A.

In certain embodiments, the first and second race surfaces 46, 48 are concave. FIG. 3A depicts the first race surface 46 being concave. In other embodiments, the first and second race surfaces 46, 48 are planar. FIG. 3B depicts the first race surface 46 as being planar. It is to be appreciated that the first and second race surfaces 46, 48 may be of any geometric shape, including convex and polygonal, among other possible shapes.

The first race surface 46 of the first outer race 26 may be angularly tilted from 60 to 85 degrees relative to the axis A, may be angularly tilted from 65 to 80 degrees relative to the axis A, and may be angularly tilted 66 to 75 degrees relative to the axis A. It is to be appreciated that this range is merely exemplary. For instance, the first race surface 46 of the first outer race 26 may be angularly tilted more than 85 degrees relative to the axis A, or the first race surface 46 of the first outer race 26 may be angularly tilted less than 60 degrees relative to the axis A.

It is to be appreciated that the degree at which the first race surface 46 of the first outer race 26 is angularly tilted relative to the axis A may be complementary with a first bearing contact angle at which the first rolling element 30 is in contact with the first outer race 26 and the inner race 24 relative to a radial cross-section along the axis A. Said differently, the degree at which the first race surface 46 of the first outer race 26 is angularly tilted may sum with a degree of the first bearing contact angle to equal 90 degrees. The degree of the first bearing contact angle may be from 5 and 30 degrees, may be from 10 and 25 degrees, or may be from 15 and 24 degrees.

The second race surface 48 of the second outer race 28 may be angularly tilted from 60 to 85 degrees relative to the axis A, may be angularly tilted from 65 to 80 degrees relative to the axis A, and may be angularly tilted from 66 to 75 degrees relative to the axis A. It is to be appreciated that this range is merely exemplary. For instance, the second race surface 48 of the second outer race 28 may be angularly tilted more than 85 degrees relative to the axis A, or the second race surface 48 of the second outer race 28 may be angularly tilted less than 60 degrees relative to the axis A.

It is to be appreciated that the degree at which the second race surface 48 of the second outer race 28 is angularly tilted relative to the axis A may be complementary with a second bearing contact angle at which the second rolling element 32 is in contact with the second outer race 28 and the inner race 24 relative to a radial cross-section along the axis A. Said differently, the degree at which the second race surface 48 of the second outer race 28 is angularly tilted may sum with a degree of the second bearing contact angle to equal 90 degrees. The degree of the second bearing contact angle may be from 5 and 30 degrees, may be from 10 and 25 degrees, or may be from 15 and 24 degrees.

Although not required, the bearing assembly 22 may further include a first squeeze film damper cup 50 including the first outer race 26, and the bearing assembly 22 may further include a second squeeze film damper cup 52 including the second outer race 28. It is to be appreciated that the first squeeze film damper cup 50 and the first outer race 26 may be formed integrally with one another. Alternatively, the first squeeze film damper cup 50 and the first outer race 26 may be separate components. In the embodiments where the first squeeze film damper cup 50 is a separate component from the first outer race 26, the first outer race 26 may be press-fit in, or otherwise physically affixed to, the first squeeze film damper cup 50. Similarly, it is to be appreciated that the second squeeze film damper cup 52 and the second outer race 28 may be formed integrally with one another. Alternatively, the second squeeze film damper cup 52 and the second outer race 28 may be separate components. In the embodiments where the second squeeze film damper cup 52 is the separate component from the second outer race 28, the second outer race 28 may be press-fit in, or otherwise physically affixed to, the second squeeze film damper cup 52.

The first and second squeeze film damper cups 50, 52 allow a layer or film of lubricant to exist between the first and second squeeze film damper cups 50, 52 and either the bearing housing 38, the turbine housing 40, the compressor housing 42, or the back plate 44, among other options. The layer or film of lubricant damps vibrations of the bearing assembly 22, preventing noise, vibration, and harshness in the turbocharger 10.

In certain embodiments, at least one of the first squeeze film damper cup 50, the first outer race 26, the second squeeze film damper cup 52, and the second outer race 28 has an anti-rotation element 54 configured to prevent rotation between a housing 56 disposed about the bearing assembly and the at least one of the first squeeze film damper cup 50, the first outer race 26, the second squeeze film damper cup 52, and the second outer race 28.

Said differently, the anti-rotation element 54 may prevent rotation between the housing 56 and the first squeeze film damper cup 50, may prevent rotation between the housing 56 and the first outer race 26, may prevent rotation between the housing 56 and the second squeeze film damper cup 52, may prevent rotation between the housing 56 and the second outer race 28, or may prevent rotation between the housing 56 and any combination of the first squeeze film damper cup 50, the first outer race 26, the second squeeze film damper cup 52, and the second outer race 28. The housing 56 may be the bearing housing 38, the turbine housing 40, the compressor housing 42, or the back plate 44; and the anti-rotation element 54 may be a pin, a bolt, a stud, or any other male member that is able to be received in a bore of the housing 56.

In some embodiments, at least one of the first outer race 26 and the first squeeze film damper cup 50 has a first shoulder 58 extending radially away from the shaft 12 that is directly coupled to the first biasing member 34 to bias the at least one of the first outer race 26 and the first squeeze film damper cup 50 toward the second outer race 28. Said differently, the first outer race 26 may have the first shoulder 58 extending radially away from the shaft 12, and the first biasing member 34 may be directly coupled to the first shoulder 58 to bias the first outer race 26 toward the second outer race 28. Alternatively, the first squeeze film damper cup 50 may have the first shoulder 58 extending radially away from the shaft 12, and the first biasing member 34 may be directly coupled to the first shoulder to bias the first squeeze film damper cup 50 toward the second outer race 28.

In the embodiments where either the first outer race 26 or the first squeeze film damper cup 50 has the first shoulder 58, at least one of the second outer race 28 and the second squeeze film damper cup 52 has a second shoulder 60 extending radially away from the shaft 12 that is directly coupled to the second biasing member 36 to bias the at least one of the second outer race 28 and the second squeeze film damper cup 52 toward the first outer race 26. Said differently, the second outer race 28 may have the second shoulder 60 extending radially away from the shaft 12, and the second biasing member 36 may be directly coupled to the second shoulder 60 to bias the second outer race 28 toward the first outer race 26. Alternatively, the second squeeze film damper cup 52 may have the second shoulder 60 extending radially away from the shaft 12, and the second biasing member 36 may be directly coupled to the second shoulder to bias the second squeeze film damper cup 52 toward the first outer race 26.

In the embodiments where the bearing assembly 22 includes the first shoulder 58, the first biasing member 34 may be configured to bias the first outer race 26 toward the second outer race 28 by exerting the first biasing force against the first shoulder 58 in the first biasing direction BD1 that is axially toward the second shoulder 60. Additionally, in the embodiments where the bearing assembly 22 includes the second shoulder 60, the second biasing member 36 may be configured to bias the second outer race 28 toward the first outer race 26 by exerting the second biasing force against the second shoulder 60 in the second biasing direction BD2 that is axially toward the first shoulder 58.

The inner race 24 of the bearing assembly 22 may be of numerous designs, as shown in FIGS. 2A, 2B, and 2C. In one embodiment, as shown in FIG. 2A, the inner race 24 is a unitary component. In other words, the inner race 24 may extend approximately between the first and second shaft portions 14, 16 of the shaft 12 such that the inner race 24 is a single piece between the first and second rolling elements 30, 32.

Alternatively, as shown in FIG. 2B, the inner race 24 may include a first inner race 62 disposed between the first outer race 26 and the shaft 12, and may include a second inner race 64 disposed between the second outer race 28 and the shaft 12. In the embodiments with the first and second inner races 62, 64, the first inner race 62 and the second inner race 64 are separate components. The first inner race 62 may extend approximately from the first shaft portion 14 of the shaft 12 toward the second inner race 64. Similarly, the second inner race 64 may extend approximately from the second shaft portion 16 of the shaft 12 toward the first inner race 62. The first and second inner races 62, 64 may contact one another in a location disposed approximately between the first and second shaft portions 14, 16 of the shaft 12. The first and second inner races 62, 64 may be symmetrically mirrored about the location disposed approximately between the first and second shaft portions 14, 16 of the shaft 12.

In yet another embodiment, as shown in FIG. 2C, the bearing assembly 22 further includes a spacer 66 disposed between the first inner race 62 and the second inner race 64 to hold the first inner race 62 between the first outer race 26 and the shaft 12, and to hold the second inner race 64 between the second outer race 28 and the shaft 12. The spacer 66 may be disposed in the location disposed approximately between the first and second shaft portions 14, 16 of the shaft 12. The spacer 66 is comparatively inexpensive and allows for the first and second inner races 62, 64 to be smaller, thus saving manufacturing costs of the first and second inner races 62, 64. In the embodiments with the spacer 66, the first and second inner races 62, 64 may also be symmetrically mirrored about the location disposed approximately between the first and second shaft portions 14, 16 of the shaft 12.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A turbocharger for delivering compressed air to an internal combustion engine, said turbocharger comprising:
   a shaft extending along an axis between a first shaft portion and a second shaft portion spaced from said first shaft portion along said axis;
   a compressor wheel coupled to said first shaft portion of said shaft;
   a turbine wheel coupled to said second shaft portion of said shaft; and a bearing assembly disposed between said first and second shaft portions of said shaft and coupled to said shaft for supporting rotation of said shaft, said bearing assembly comprising:
  an inner race coupled to said shaft between said first and second shaft portions of said shaft;
  a first squeeze film damper cup including a first outer race, with said first outer race proximate to said first shaft portion of said shaft and spaced radially from said inner race;
  a second squeeze film damper cup including a second outer race, with said second outer race spaced from said first outer race along said axis, proximate to said second shaft portion of said shaft, and spaced radially from said inner race;
  a first rolling element disposed between said first outer race and said inner race for supporting rotation of said shaft;
  a second rolling element disposed between said second outer race and said inner race for supporting rotation of said shaft;
  a first biasing member coupled to said first outer race and configured to bias said first outer race toward said second outer race and against said first rolling element to preload said first rolling element; and
  a second biasing member coupled to said second outer race and configured to bias said second outer race toward said first outer race and against said second rolling element to preload said second rolling element,
  wherein at least one of said first outer race and said first squeeze film damper cup has a first shoulder extending radially away from said shaft that is directly coupled to said first biasing member to bias said at least one of said first outer race and said first squeeze film damper cup toward said second outer race, and at least one of said second outer race and said second squeeze film damper cup has a second shoulder extending radially away from said shaft that is directly coupled to said second biasing member to bias said at least one of said second outer race and said second squeeze film damper cup toward said first outer race.

2. The turbocharger as set forth in claim 1, wherein said first outer race has a first race surface angularly tilted relative to said axis that is in contact with said first rolling element, and said second outer race has a second race surface angularly tilted relative to said axis that is in contact with said second rolling element.

3. The turbocharger as set forth in claim 2, wherein said first race surface is configured to exert a first force against said first rolling element in a first direction to preload said first rolling element, and said second race surface is configured to exert a second force against said second rolling element in a second direction to preload said second rolling element.

4. The turbocharger as set forth in claim 3, wherein said first direction that said first force is configured to be exerted is both radially toward said shaft and axially toward said second outer race, and wherein said second direction that said second force is configured to be exerted is both radially toward said shaft and axially toward said first outer race.

5. The turbocharger as set forth in claim 2, wherein said first and second race surfaces are concave.

6. The turbocharger as set forth in claim 2, wherein said first and second race surfaces are planar.

7. The turbocharger as set forth in claim 2, wherein said first race surface of said first outer race is angularly tilted 60 to 85 degrees relative to said axis.

8. The turbocharger as set forth in claim 2, wherein said second race surface of said second outer race is angled 60 to 85 degrees relative to said axis.

9. The turbocharger as set forth in claim 1, wherein at least one of said first squeeze film damper cup, said first outer race, said second squeeze film damper cup, and said second outer race has an anti-rotation element configured to prevent rotation between a housing disposed about said bearing assembly and said at least one of said first squeeze film damper cup, said first outer race, said second squeeze film damper cup, and said second outer race.

10. The turbocharger as set forth in claim 1, wherein said first biasing member is configured to bias said first outer race toward said second outer race by exerting a first biasing force against said first shoulder in a first biasing direction that is axially toward said second shoulder, and said second biasing member is configured to bias said second outer race toward said first outer race by exerting a second biasing force against said second shoulder in a second biasing direction that is axially toward said first shoulder.

11. The turbocharger as set forth in claim 1, wherein said inner race is a unitary component.

12. The turbocharger as set forth in claim 1, wherein said inner race includes a first inner race disposed between said first outer race and said shaft and includes a second inner race disposed between said second outer race and said shaft, with said first inner race and said second inner race being separate components.

13. The turbocharger as set forth in claim 12, wherein said bearing assembly further comprises a spacer disposed between said first inner race and said second inner race to hold said first inner race between said first outer race and said shaft, and to hold said second inner race between said second outer race and said shaft.

14. The turbocharger as set forth in claim 1, wherein said first rolling element is a first ball bearing and said second rolling element is a second ball bearing.

15. A bearing assembly for supporting rotation of a shaft in a turbocharger, said bearing assembly comprising:
  an inner race extending along an axis and configured to be coupled to the shaft between first and second shaft portions of the shaft;
  a first squeeze film damper cup including a first outer race, with said first outer race spaced radially from said inner race and configured to be proximate to the first shaft portion of the shaft;
  a second squeeze film damper cup including a second outer race, with said second outer race spaced radially from said inner race, spaced from said first outer race along said axis, and configured to be proximate to the second shaft portion of the shaft;
  a first rolling element disposed between said first outer race and said inner race for supporting rotation of the shaft;
  a second rolling element disposed between said second outer race and said inner race for supporting rotation of the shaft;
  a first biasing member coupled to said first outer race and configured to bias said first outer race toward said second outer race and against said first rolling element to preload said first rolling element; and
  a second biasing member coupled to said second outer race and configured to bias said second outer race toward said first outer race and against said second rolling element to preload said second rolling element, wherein at least one of said first outer race and said first squeeze film damper cup has a first shoulder extending radially away from said shaft that is directly coupled to said first biasing member to bias said at least one of said first outer race and said first squeeze film damper cup toward said second outer race, and at least one of said second outer race and said second squeeze film damper cup has a second shoulder extending radially away from said shaft that is directly coupled to said second biasing member to bias said at least one of said second outer race and said second squeeze film damper cup toward said first outer race.

16. The bearing assembly as set forth in claim 15, with the turbocharger including a housing configured to be disposed about the bearing assembly, wherein at least one of said first squeeze film damper cup, said first outer race, said second squeeze film damper cup, and said second outer race has an anti-rotation element configured to prevent rotation between the housing and said at least one of said first squeeze film damper cup, said first outer race, said second squeeze film damper cup, and said second outer race.

17. The bearing assembly as set forth in claim 15, wherein said first biasing member is configured to bias said first outer race toward said second outer race by exerting a first biasing force against said first shoulder in a first biasing direction that is axially toward said second shoulder, and said second biasing member is configured to bias said second outer race toward said first outer race by exerting a second biasing force against said second shoulder in a second biasing direction that is axially toward said first shoulder.

18. The bearing assembly as set forth in claim 15, wherein said first outer race has a first race surface angularly tilted relative to said axis that is in contact with said first rolling element, wherein said second outer race has a second race surface angularly tilted relative to said axis that is in contact with said second rolling element, wherein said first race surface of said first outer race is angularly tilted 60 to 85 degrees relative to said axis, and wherein said second race surface of said second outer race is angled 60 to 85 degrees relative to said axis.

19. The bearing assembly as set forth in claim 15, wherein said first rolling element is a first ball bearing and said second rolling element is a second ball bearing.

\* \* \* \* \*